Aug. 17, 1965  J. A. NIETO, JR  3,200,976
COMBINED VEHICLE ASSEMBLY AND LOADER
Original Filed Oct. 19, 1959

Joe A. Nieto, Jr.
INVENTOR.

BY *[signatures]*
Attorneys

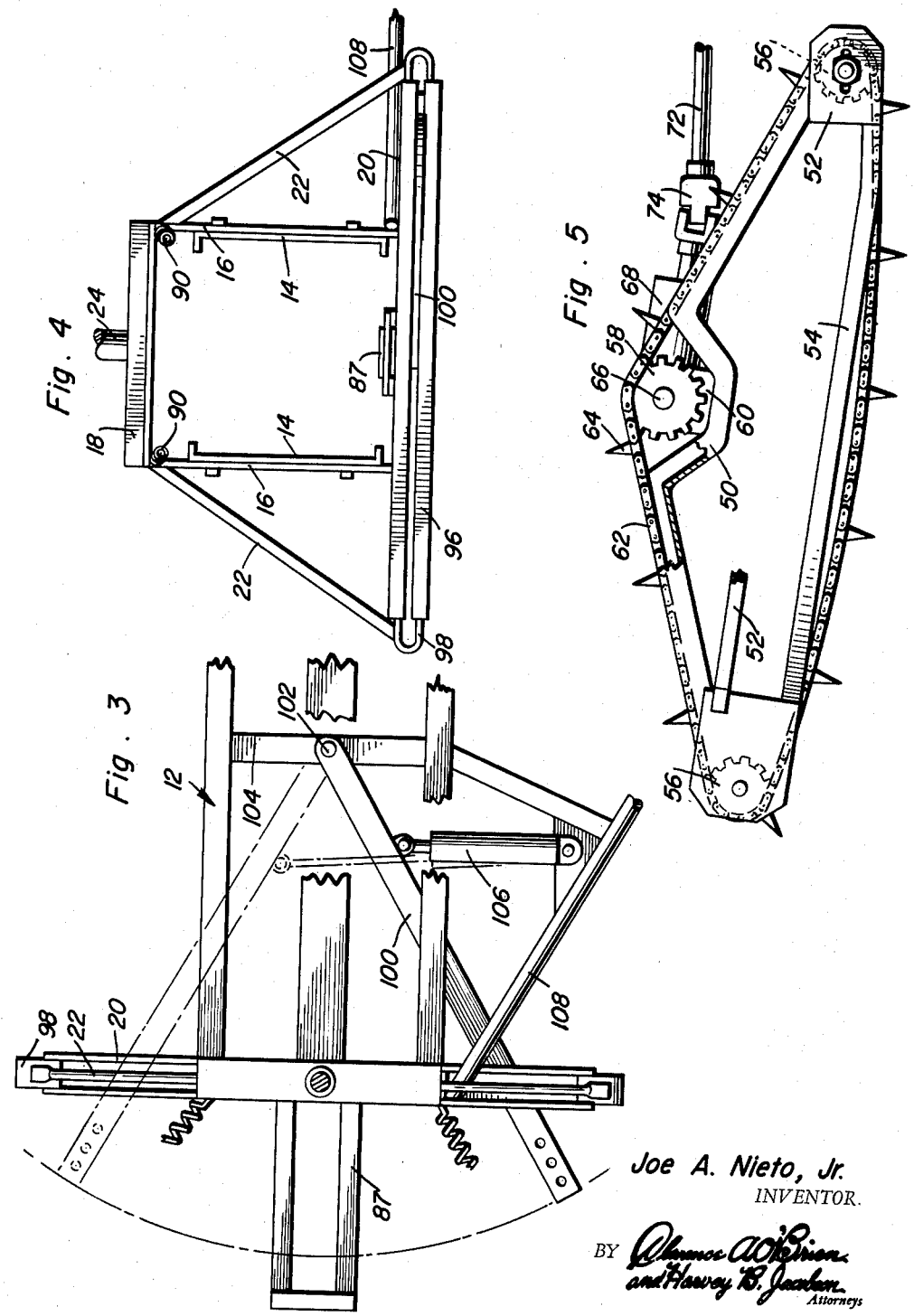

Aug. 17, 1965  J. A. NIETO, JR  3,200,976
COMBINED VEHICLE ASSEMBLY AND LOADER
Original Filed Oct. 19, 1959
4 Sheets-Sheet 3
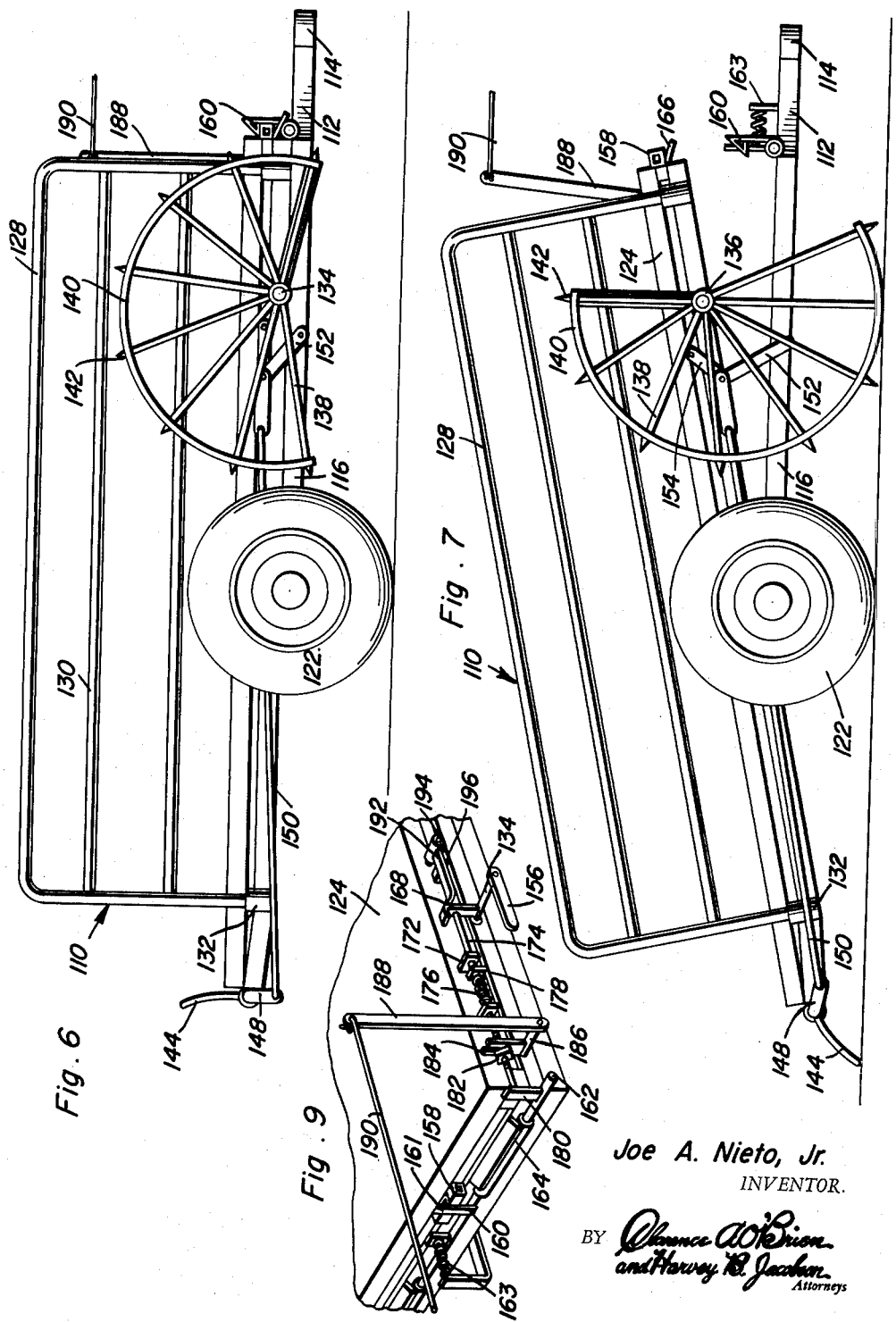
Joe A. Nieto, Jr.
INVENTOR.

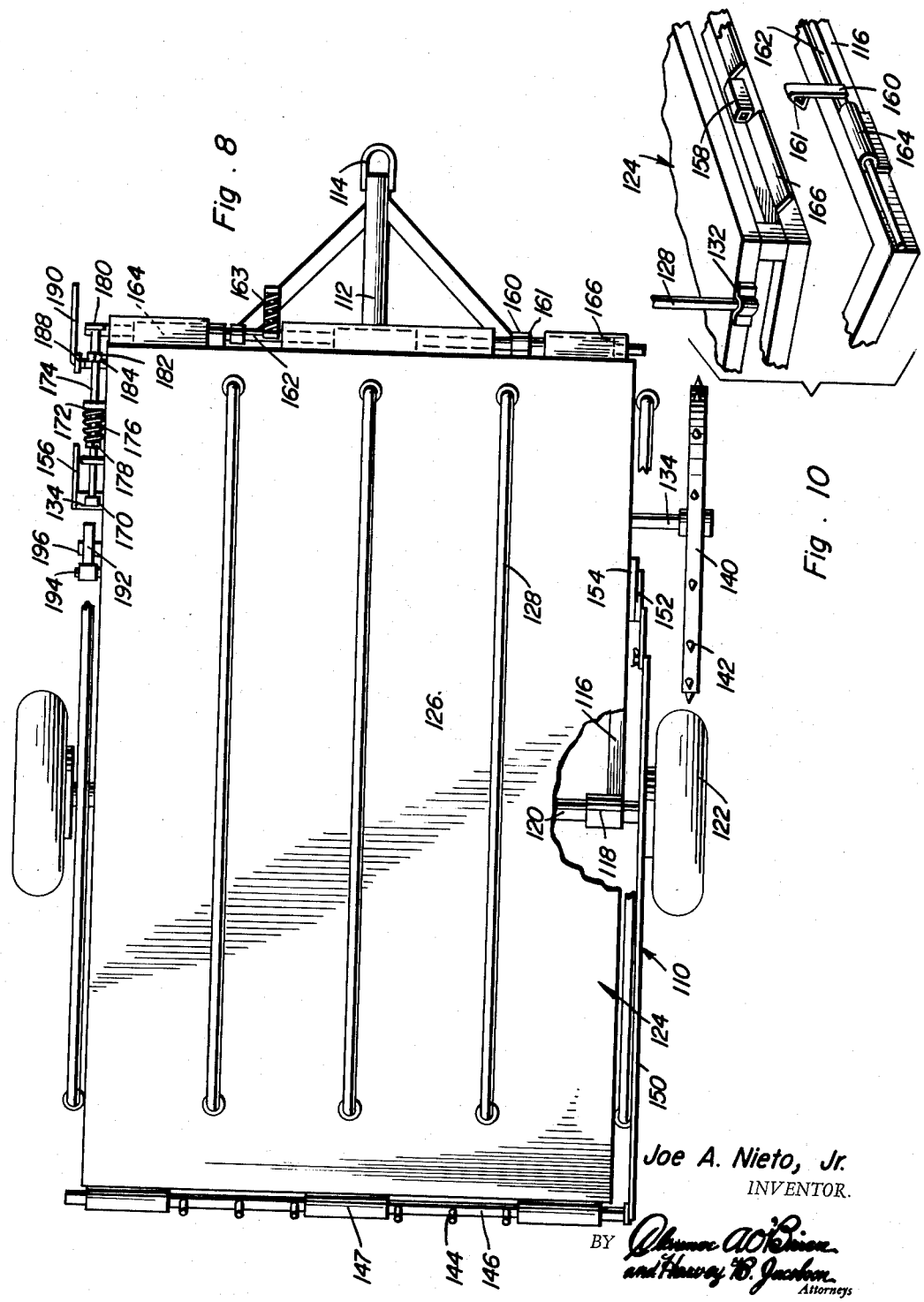

United States Patent Office 3,200,976
Patented Aug. 17, 1965

3,200,976
COMBINED VEHICLE ASSEMBLY AND LOADER
Joe A. Nieto, Jr., Rte. 2, Box 49, Roswell, N. Mex.
Original application Oct. 19, 1959, Ser. No. 847,187, now Patent No. 3,052,342, dated Sept. 4, 1962. Divided and this application June 14, 1962, Ser. No. 202,454
5 Claims. (Cl. 214—508)

The present application, a division of application Serial No. 847,187, now Patent No. 3,052,342, generally relates to a hay bale handling device and more particularly to an attachment for hay balers for receiving the bales of hay therefrom and transporting the bales of hay onto an attached trailer, which trailer is filled with a predetermined number of bales of hay and then automatically dumped whereby the bales of hay will be dumped on the field in groups rather than being deposited directly onto the ground from the hay baler.

In present day practice, it is usual for a pickup baler to pick up the cured hay directly from a window and compress the hay into bales and discharge the bales back onto the ground surface at spaced intervals. This requires a second picking up operation which is either done by hand or by various machines for picking up bales of hay and depositing them on vehicles such as trucks, wagons or the like. In view of the scattered condition of the bales of hay when discharged from the baler, it is a time consuming job in loading the bales of hay onto a load carrying vehicle. Therefore, it is the primary object of the present invention to provide an attachment for hay balers which will gather a plurality of hay bales onto a trailer, the trailer being dumped so that a plurality of bales of hay will be discharged onto the field at the point of dumping of the trailer thereby facilitating subsequent loading and transportation of the bales of hay.

Another object of the present invention is to provide an attachment for hay balers which includes a mechanism for conveying the bales of hay rearwardly and guiding them onto a trailer, and, a trailer including a mechanism for retaining the bales of hay or discharging these bales at the option of the user of the device.

A further important object of the present invention is to provide an attachment for a hay baler which may be swung in a vertical plane and also in a horizontal plane for discharging the bales of hay onto the trailer in vertical rows disposed in laterally spaced relation thereby completely filling the trailer so that a predetermined number of bales of hay will be discharged by the trailer.

Yet another feature of the present invention is to provide a device for hay balers which is simple in construction, easy to operate, easy to attach, efficient in handling baled hay and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a plan view with portions broken away illustrating the tongue attachment and means for adjusting the tongue;

FIGURE 4 is an end elevational view of the discharge end of the baler and illustrating the construction of FIGURE 3;

FIGURE 5 is a detailed elevational view of the mechanism for propelling the bales of hay with portions broken away;

FIGURE 6 is a side elevational view of the trailer illustrating its normal transport position;

FIGURE 7 is a side elevation similar to FIGURE 6 but showing the dump trailer in dumped position;

FIGURE 8 is a plan view of the trailer with portions broken;

FIGURE 9 is a detailed view illustrating the latch structure for the forward end of the trailer; and FIGURE 10 is a partial perspective view of the forward corner of the trailer.

Figure 1:
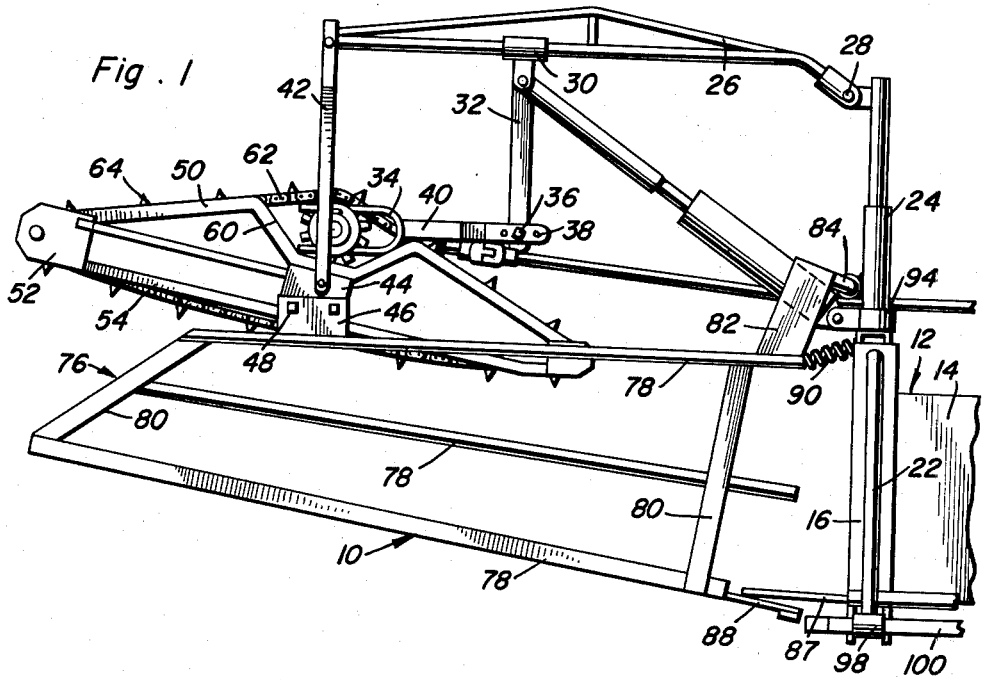
FIGURE 1 is a side elevational view of a portion of the device illustrating the manner in which the device is assembled onto a baler.
Figure 2:
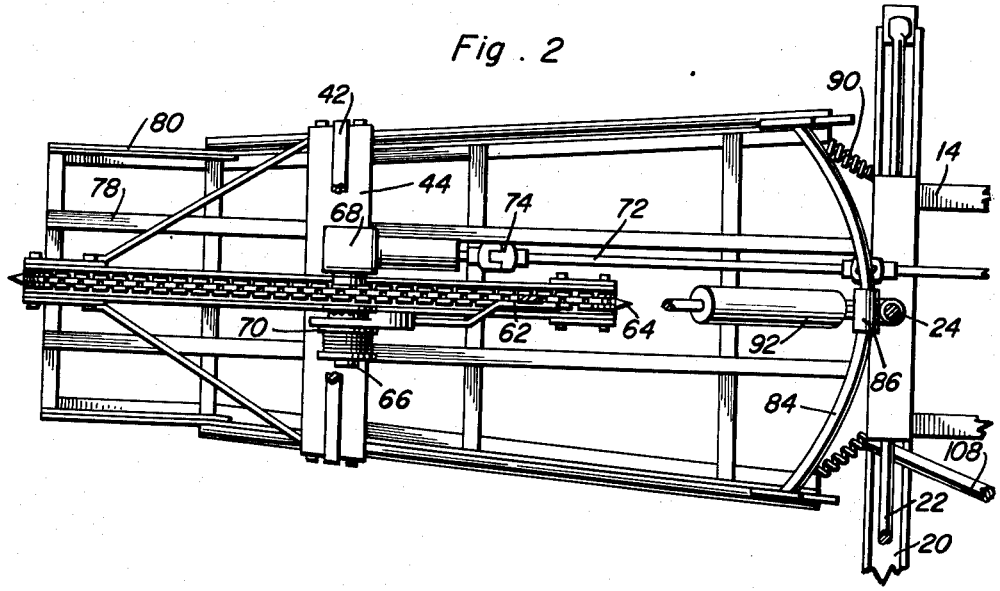
FIGURE 2 is a plan view of the construction of FIGURE 1 with a portion of the upper framework structure being broken away for clarity.

Referring now specifically to the drawings, the numeral 10 generally designates that portion of the device of the present invention which is attached directly to a hay baler generally designated by the numeral 12 which includes the usual delivery chute or compression chamber 14 which may be of any conventional construction for discharging a bale of hay in a compressed form. Attached to the compression chamber 14 is a pair of uprights 16 interconnected by a transverse frame member 18 and an elongated bottom member 20 having the ends thereof braced by inclined brace members 22 extending upwardly and connected to the top edges of the side members 16. Extending upwardly from the transverse member 18 is a vertical post 24 having extending therefrom an arm 26 generally in the form of a truss which is attached to the upper end of the vertically adjustable post by virtue of a pivot pin 28. Slidably disposed on the lower beam of the truss 26 is a sleeve 30 having a depending member 32 connected thereto, the depending member 32 being adjustably connected to a clutch operating yoke 34 by virtue of a removable bolt 36 passing selectively through apertures 38 in the yoke arm 40. The outer end of the truss 26 supports a pair of depending and diverging straps 42 that connect to opposite ends of a transverse support plate 44 which ends have supporting members 46 attached thereto by bolts 48. The transverse support plate 44 supports a longitudinally extending frame member 50 which is provided with plate members 52 at each end thereof, a lower frame member 54 also interconnecting the plate members 52 thereby providing a generally rigid triangular construction. Each of the plate members 52 is provided with a sprocket gear 56 therebetween which sprocket gears 56 are in alignment with a sprocket gear 58 disposed in a recess 60 in the top frame member 50. An endless sprocket chain 62 encircles the sprocket gears and the chain 62 is provided with a plurality of longitudinally spaced projecting points or barbs 64 which act to engage a bale of hay on the lower run of the chain which is below the transverse plate 44 and which extends below the lower frame member 54.

The sprocket gear 58 is driven from the power output shaft 66 of a gear box 68 and is selectively connected to the shaft 66 by a clutch gear 70 selectively rendered engageable with the sprocket gear 58 by virtue of the yoke 34 which will disengage the clutch member 70 when moved inwardly and permit engagement of the clutch member 70 and the sprocket gear 58 when retracted thereby providing for driving of the sprocket chain 62. The gear box 68 is provided with an input from a power take-off shaft 72 having the necessary universal connections 74. The power take-off 72 is driven from a suitable source on the hay baler.

Supported below the conveying chain 62 is a chute generally designated by the numeral 76 which includes a plurality of longitudinal members 78 and vertical framing member 80. The upper longitudinal members 78 are connected to the supporting brackets 46 while the front ends thereof are connected to and supported by a pair of upstanding brackets 82 having an elongated arcuate rod 84 extending therebetween, the arcuate rod being slidably received within a sleeve 86 attached to the vertical post 24. The hay baler compressor 14 is provided with an extension member 87 which overlies a forward extension 88 projecting from the bottom rails 78 of the chute 76 for providing somewhat of a continuous path for the bales of hay. For centering the chute 76, a pair of springs 90 are provided which extend between the outer corners of the upper ends of the chute and the adjacent edges of the upright framing members 16.

A piston and cylinder arrangement 92 extends between the sleeve 30 and a collar 94 secured to the upstanding post 24 and by expansion and contraction of the piston and cylinder arrangement 92, the clutch 70 may be engaged or disengaged for causing driving movement of the chain 62 or permitting the chain to be idle.

Supported below the lower transverse member 20 is a second lower transverse member 96 interconnected with the ends of the upper transverse member 20 by U-shaped end pieces 98. Slidingly disposed between the members 20 and 96 is a drawbar 100 pivotally supported by a pivot pin 102 from a transverse member 104 under the compressing chamber 14. Connected to the drawbar 100 is a hydraulic piston and cylinder arrangement 106 which connects the drawbar 100 and framing elements 108 for moving the drawbar 100 swivelly back and forth between the limits provided by the U-shaped members 98.

When the bales are discharged from the compressor chamber 14 in the usual manner they are discharged into the chute 76. As the bales are discharged into the chute 76, they are picked up by the teeth or projections 64 on the conveyor chain 62 and are moved rearwardly to the discharge end of the chute 76. The discharge chute end is normally centralized by the springs 90 and the sliding engagement between the arcuate member 84 and the sleeve 86. The entire attachment may swivel about the center of the upstanding post 24 which has the sleeve mounted thereon for rotation. When the piston and cylinder arrangement 92 is expanded, the clutch operation will be affected in such a manner that the conveying chain will be declutched or disengaged from its driving force as the entire assembly is lifted due to lengthening of the diagonal formed by the piston and cylinder arrangement 92 thus elevating the discharge end of the chute 76 so that it may become elevated for discharging the bale of hay at an elevated position.

Referring now specifically to FIGURES 6–10 of the drawings, the numeral 110 designates the dumping trailer which is connected to the drawbar 100 by virtue of a forwardly extending tongue 112 having a generally U-shaped fitting 114 on the forward end thereof for detachable connection to the rear end of the drawbar 100. The tongue 112 extends rearwardly in the form of a horizontal U-shaped frame 116 terminating in transverse sleeves 118 encircling a transverse rigid axle 120 carrying ground engaging wheels 122 on the outer ends thereof which may be of the type having pneumatically inflated tires thereon. Carried by the axle 120 is a load supporting platform 124 having the surface thereof divided into a plurality of longitudinal areas 126 by upstanding U-shaped tubular rods or pipes 128 forming partitions and having the vertical legs thereof interconnected by a plurality of longitudinal members 130. The lower ends of the inverted U-shaped rods 128 are detachably received in vertically disposed sockets 132 for permitting removal of the tubular partition members which divide the load carrying platform 124 into the plurality of areas 126. Thus, the chute may discharge the bales of hay into the different areas 126 by virtue of the drawbar 100 being shifted laterally for aligning the different areas 126 with the discharge chute. Further, the elevation adjustment feature of the discharge chute will enable the bales of hay to be stacked between the different partitions 128 and the entire stack pushed rearwardly until the entire area 126 is filled after which another area 126 is filled and after all of the areas are filled, a dumping mechanism is operated for dumping the bales from the trailer onto the ground.

The dumping mechanism includes a shaft 134 rotatably mounted adjacent the forward end of the platform 124. The shaft 134 is provided with a hub 136 at one end and a plurality of spokes 138 extend outwardly from hub 136. The spokes 138 are secured to an eccentric rim member 140 and the rim 140 is provided with radial projections 142 for traction. The rim 140 is eccentric about the shaft 134 and will elevate the forward end of the platform 124 about axle 120 when the entire eccentric wheel assembly is rotated about the axis of the shaft 134 to initially bring the lowest point of the eccentric rim into engagement with the ground surface whereby subsequent forward movement of the trailer will cause the forward end of the platform to be elevated as the highest point of the rim engages the ground surface. Elevation of the forward end of the platform 124 will cause the rearward pivotal movement of a rear tailgate assembly in the form of upstanding rods 144, the rods 144 being carried by a transverse shaft 146 journaled in sleeves 147 attached to the rear edge of the platform 124. One end of shaft 146 has laterally extending operating arm 148 attached thereto and the arm 148 is connected to an elongated rod 150 which extends forwardly alongside platform 124. The forward end of the rod 150 is connected to the juncture point of a pair of links 152 and 154 which are pivotally connected to the frame 116 and the plaftorm 124 respectively. Thus, upward movement of the forward end of the platform 124 will cause the pivotal connection between the links 154 and 152 to move forwardly as the links 152 and 154 straighten out into alignment with each other. This moves rod 150 forwardly and swings rods 144 rearwardly thus allowing hay bales to slide off the rear of the platform 124.

The other end of the shaft 134 is provided with an elongated handle 156 which is in the form of a weight which overbalances the wheel assembly for normally urging the low point of the eccentric rim 140 downwardly towards the ground surface from the condition illustrated in FIGURE 6. Also, the forward edge of the platform 124 is provided with forwardly projecting hollow rectangular members 158 for engagement by hook-type latches 160 mounted on a transverse shaft 162, each latch having an inclined cam surface 161 for forcing the latch 160 outwardly when the member 158 passes downwardly. The shaft 162 is carried by bearing brackets 164 on the frame 116 and the platform is provided with downwardly inclined members 166 overlying and engaging the bearing members 164 when the latches 160 are engaged with the rectangular members 158. The shaft 162 is biased in a direction towards the frame 116 by a coil spring 163 engaged with a suitable lug on shaft 162. The spring may be either a compression or tension spring and is associated with the shaft 162 to urge latches 160 towards the members 158 for latching engagement therewith.

FIGURE 9 illustrates the details of the latch mechanism in which the transverse shaft 134 which supports the eccentric wheel assembly on one end thereof and has the eccentric weight 156 on the other end thereof is provided with an upstanding lug 168 having a forwardly extending upper end 170. Mounted on the side edge of the platform 124 is a pair of guide lugs 172 which slidably support a longitudinal rod 174 having the rear end thereof normally abuttingly engaging the front surface of the lug 168 below the forwardly extending top edge 170. A compression coil spring 176 is engaged between the forwardmost lug 172 and a stop nut 178 on the rod 174 thus spring biasing the rod rearwardly into engagement with the lug 168. The forward end of the rod 174 is disposed immediately adjacent the inner surface of an upstanding lug 180 rigid with the transverse shaft 162 carrying the latches 160 thereon. Thus, when the rod 174 is moved longitudinally forwardly, the forward end thereof will engage the lug 180 and cause the shaft 162 to pivot for swinging the latches 160 forwardly thereby disengaging the latches from the rectangular members 158 which will permit the platform 124 to swing upwardly about the axle 120. Also, the forward movement of the rod 174 will withdraw the rear end thereof away from the lug 168 which will permit the lug 168 and the shaft 134 to rotate in a counter-clockwise direction as seen in FIGURE 9 whereby the overbalance weight 156 will cause the shaft 134 and the eccentric wheel assembly to rotate for bringing the low point of the eccentric rim 140 into engagement with the ground surface. This is permitted by virtue of the rod 174 being moved out of the path of movement of the lug 168 as it moves in a circular path.

The mechanism for moving the rod 174 longitudinally includes an abutment or stop member 182 on the rod member which has abutting contact with a slotted lug 184 carried by a shaft 186 supported on the platform 124. The shaft 186 is rotatable and provided with an elongated upstanding arm or lever 188 to which is attached a flexible line 190 at the upper end thereof which extends forwardly to an operator's position whereby an operator may pull the line 190 and rotate the shaft 186 which will swing the slotted lug 184 in an arcuate path thus pulling the rod 174 forwardly and releasing the latches 160 and releasing the shaft 134 for revolution in a counter-clockwise manner.

Disposed rearwardly of the lug 168 is a pivotal dog or pawl 192 carried by a pin 194 and resting normally in a horizontal position against a lug 196 with the forward end thereof disposed adjacent the rear surface of the lug 168 to prevent reverse rotation thereof thus providing a one revolution clutch arrangement with the overbalance of the eccentric wheel and weight 156 causing the wheel assembly to rotate back to the position of FIG. 6 and to be locked in this position until the flexible line 190 is pulled.

The hay bales are loaded onto the trailer by causing the trailer to be laterally moved for alignment of the different areas with the discharge chute of a pickup baler or stationary baler which are conveyed onto the trailer by the conveying chain and other associated equipment.

When the trailer has been filled with bales of hay, the trip rope 190 is actuated for elevating the front end of the platform and at the same time lowering the rear retainer rods 144 so that the hay bales can slide off of the trailer. As the eccentric wheel completes its revolution it will be disposed in the condition illustrated in FIGURE 6 and the front end of the trailer will drop whereby the lower outer corners of the projections 158 will engage the cam surface 161 of the latches 160 in an obvious manner for again locking the trailer in position for receiving additional bales of hay.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An attachment for hay balers having a discharge compressor assembly comprising an elongated chute adapted to be mounted in alignment with the compressor assembly of the hay baler for receiving bales of hay therefrom, means mounted on the chute for moving hay bales longitudinally thereon, a drawbar adapted to be connected to the baler and extending rearwardly therefrom, and a trailer connected to the drawbar and disposed in trailing relation to the chute for receiving baled hay from the chute, said trailer being dumpable, means laterally adjusting the drawbar for orientating the trailer laterally in relation to the discharge end of the chute for receiving bales of hay substantially throughout the area thereof, said means for moving bales of hay along the chute including an endless sprocket chain conveyor assembly overlying the chute and including a lower horizontal run adapted to engage the top surface of a bale of hay for moving the bale of hay along the chute, said chain having outwardly extending projections thereon for engagement with a bale of hay, means for elevating the outer end of the chute, and means connected with the elevating means for rendering the conveyor chain inoperative when the conveyor is elevated.

2. An attachment for hay balers comprising in combination, a supporting frame defining a bale passage, an upright provided on said frame above said passage, an elongated bale chute having inlet and outlet ends and pivotally connected at its inlet end to said frame in alignment with said passage for raising and lowering movement of the chute, a vertically swingable arm pivoted at one end thereof to said upright and extending in spaced relation above said chute, hanger means suspending the outlet end portion of the chute from the other end of said arm, a fluid operator pivotally connected to said upright and to said arm for raising and lowering said chute, an endless bale driving chain assembly carried by said hanger means and disposed longitudinally at the top of the chute, power means for driving said chain assembly, a trailer operatively associated with and disposed in trailing relation to the chute for receiving baled hay therefrom, means on the trailer for effecting the dumping thereof, and means for laterally varying the relative positions of the trailer and outlet end of the chute for positioning bales over a major portion of the width of the trailer.

3. The device of claim 2 wherein said trailer is divided into a plurality of longitudinal compartments, pivotally mounted upstanding means at the rear of the compartments retaining the bales of hay therein.

4. The device of claim 2 wherein said means for laterally varying the relative positions of the trailer and outlet and includes a drawbar adapted to be connected to the baler and extending rearwardly therefrom, said trailer being connected to said drawbar, and means for laterally adjusting the drawbar for orientating the trailer laterally.

5. An attachment for hay balers comprising in combination, a supporting frame defining a bale passage, an elongated bale chute having inlet and outlet ends and pivotally connected at its inlet end to said frame in alignment with said passage for raising and lowering movement of the chute, vertically swingable means pivotally secured to said frame and suspending the outlet end of the chute, means for raising and lowering said swingable means and the suspended outlet end of the chute, an endless bale driving chain disposed longitudinally at the top of the chute, a trailer operatively associated with and disposed in trailing relation to the chute for receiving baled hay therefrom, means on said trailer for effecting the dumping thereof, and means for laterally adjusting the trailer in relation to the outlet end of the chute for receiving bales of hay substantially throughout the area thereof.

References Cited by the Examiner

UNITED STATES PATENTS

| | | |
|---|---|---|
| 986,717 | 3/11 | Johnson. |
| 2,491,353 | 12/49 | Acton _____ 214—42 |
| 2,576,992 | 12/51 | Bainbridge et al. _____ 214—522 |
| 2,613,591 | 10/52 | Bruns et al. _____ 214—42 |
| 2,728,601 | 12/55 | Quigley _____ 214—42 |
| 2,905,343 | 9/59 | Heising. |
| 2,922,660 | 1/60 | Haugland et al. _____ 280—468 |

FOREIGN PATENTS 619,744   3/49   Great Britain.

HUGO O. SCHULZ, *Primary Examiner.*

GERALD M. FORLENZA, *Examiner.*